United States Patent [19]
Caldwell

[11] 3,750,489
[45] Aug. 7, 1973

[54] COMPOSITE DRIVE ASSEMBLY
[75] Inventor: Samuel I. Caldwell, Aurora, Ill.
[73] Assignee: Caterpillar Tractor Company, Peoria, Ill.
[22] Filed: June 7, 1972
[21] Appl. No.: 260,491

[52] U.S. Cl. ................................................ 74/434
[51] Int. Cl. ........................................... F16h 55/04
[58] Field of Search ............................. 74/434, 432

[56] References Cited
UNITED STATES PATENTS
| | | | |
|---|---|---|---|
| 2,457,942 | 1/1949 | Van Zandt | 74/432 |
| 2,857,777 | 10/1958 | Porter | 74/432 |
| 3,191,453 | 6/1965 | Hoven | 74/432 |

Primary Examiner—Leonard H. Gerin
Attorney—Freling E. Baker

[57] ABSTRACT

There is disclosed a cluster gear assembled from a pair of separate gear members. The gears are non-rotatably connected by means of a splined connection and retainer means that is operative to eliminate axial movement between the gears. The retaining means includes opposing radial shoulders on each side of one of the gear members, with one shoulder forming a camming surface and an expandable ring engaging the camming surface and one shoulder on the other gear to keep the gear members in a fixed axial position with respect to one another.

13 Claims, 4 Drawing Figures

PATENTED AUG 7 1973
3,750,489
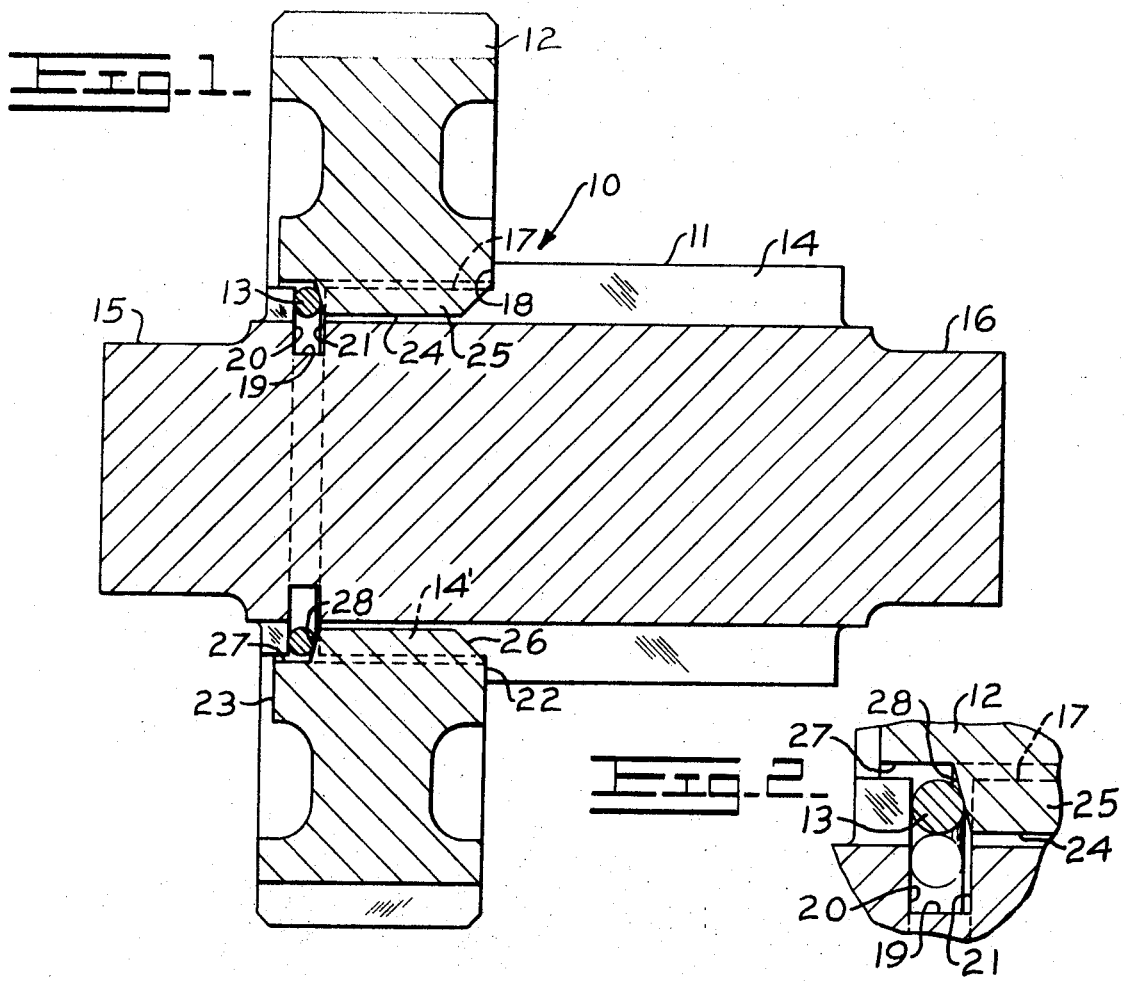
Fig. 1.
Fig. 2.
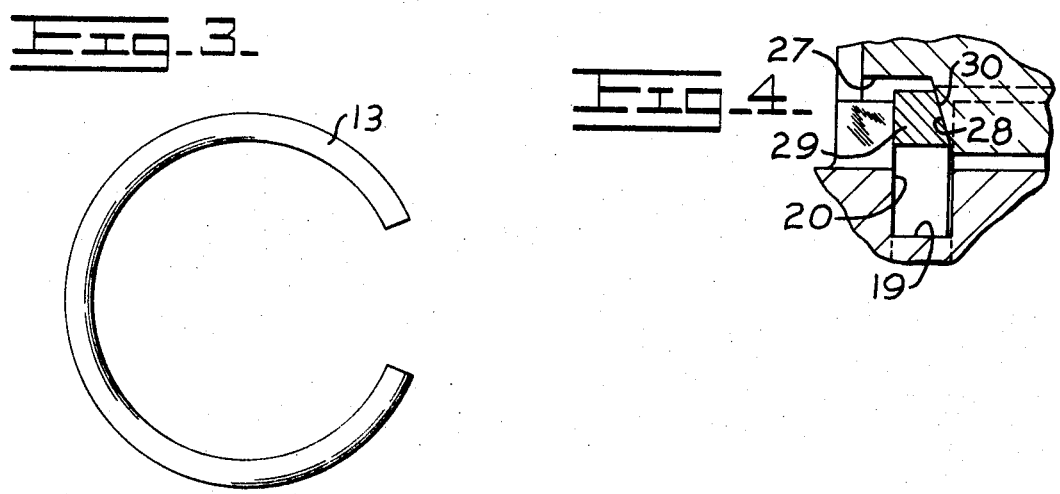
Fig. 3.
Fig. 4.

COMPOSITE DRIVE ASSEMBLY

BACKGROUND OF THE INVENTION

The present invention relates to gears and pertains more particularly to composite cluster gears.

Cluster gears are commonly employed in gear trains such as transmissions and final drives for vehicles. These gears are normally used to reduce speed and multiply torque and vice versa.

Cluster gears are usually made from one piece blanks having two or more adjacent cylindrical surfaces of different diameters. This form of construction, although desirable in many respects, creates some problems.

One problem with constructions of this type is that a relief groove must be machined in a smaller cylindrical surface adjacent to a larger cylindrical surface to provide clearance for the teeth cutting operation. A relief groove has the effect of reducing the length of the teeth of the smaller diameter gear and thus reduces the torque transmitting capacity thereof.

Another problem resulting from such construction is that the different size gears require different heat treatment because of the loads imposed thereon. However, since both gears are formed of the same integral part, they are subject to the same heat process. This usually results in improper wear characteristics for one of the gears if the other is properly treated.

A further problem with such construction is that the entire cluster must be replaced if one gear becomes worn or damaged.

One technique proposed for overcoming the above problems is to assemble a cluster gear from a plurality of separate gears. The major problem of this approach is that suitable coupling and retainer means have not been available. One such construction utilizes a keeper bar disposed in a groove of the support gear and bolted to the other. This construction does not always maintain the gears in a tight relation, due to the manufacturing tolerances and wear. Also, if the bolts or keepers should work loose, they could become lodged between the gear teeth and wreck the entire gear train.

The prior art is exemplified by the following patents: U.S. Pat. No. 2,539,387, issued Jan. 30, 1951 to H.W. Alden; and U.S. Pat. No. 2,588,333, issued Mar. 4, 1952 to W.F. Wilson.

SUMMARY OF THE INVENTION

It is the primary object of the present invention to overcome the above problems of the prior art.

Another object of the present invention is to provide an improved cluster gear assembly.

A further object of the present invention is to provide an improved keeper arrangement for assembling composite drive arrangements.

In accordance with the primary aspect of the present invention, there is provided means for the coupling of a pair of gear train members. The coupling means includes a keeper arrangement comprising an annular groove defining a pair of opposing shoulders formed in one of said members, an opposing radially outwardly axially sloping shoulder formed on the other member, and a radially expandable retaining ring having an axial thickness in excess of the distance between the opposing shoulder of the separate members in the assembled position. The retaining ring is operative in conjunction with the opposing shoulders to retain members in the assembled position and to eliminate axial clearance between the members.

BRIEF DESCRIPTION OF THE DRAWINGS

The above and other objects and advantages will become apparent from the following description when read with reference to the accompanying drawing, in which:

FIG. 1 is an elevational view in section of a preferred embodiment of the present invention;

FIG. 2 is a detailed fragmentary view of the retainer construction in accordance with the present invention;

FIG. 3 is a plan view of a retainer ring of FIG. 2; and,

FIG. 4 is a detailed fragmentary view of an alternate embodiment of the retainer means of the present invention.

DETAILED DESCRIPTION OF PREFERRED EMBODIMENTS

Referring particularly to the drawings, there is illustrated a composite drive assembly, such as a cluster gear, embodying the principles of the present invention, and indicated generally by the reference numeral 10. The cluster gear comprises a pinion 11, a spur gear 12, and suitable means such as splines and a retaining ring 13 for non-rotatably securing the gears together.

The pinion 11, as illustrated, comprises a plurality of circumferentially spaced teeth 14 formed intermediate a pair of oppositely disposed bearing surfaces 15 and 16. The pinion 11 is formed with reduced diameter portion 17 defining a shoulder 18 at an end section of the teeth adjacent to the bearing surface 15. An annular groove 19, defining a pair of opposed annular faces 20 and 21, is formed in the reduced diameter portion intermediate the bearing surface 15 and the shoulder 18.

The gear 12 is non-rotatably mounted in a suitable manner on the reduced diameter portion 17 of the pinion 11, and includes side surfaces or shoulders 22 and 23, with side 22 in abutment with the radial shoulder 18 of the pinion. The gear includes a cylindrical bore 24 having teeth 25 formed therein which mesh with complementary splines or teeth 14', which are preferably extensions of teeth 14 of the reduced diameter portion 17. This arrangement forms a spline connection to prevent relative rotation therebetween.

The bore 24 and particularly teeth 25, are provided with a chamfer 26 adjacent to the side surface 22. A recess 27, having a diameter slightly greater than the reduced diameter portion 17 of gear 11, is formed in the gear 12 and extends inwardly from the side surface 23. The recess terminates at an axially extending outwardly sloping ramp surface 28, which is disposed adjacent to and extends partially across, the annular groove 19 of the pinion gear 11. The sloping surface 28 acts as cam means under the action of retainer ring 13, which expands between surfaces or shoulders 20 and 28, forcing them apart, and shoulders 18 and 22 into tighter engagement.

The retainer ring 13 shown in FIGS. 1, 2 and 3 is preferably an arcuate spring having a generally circular cross-section. The retaining ring is disposed in the annular groove 19 of the pinion 11 and, as described above, is arranged in a force transmitting relation to the cam surface 28 of the gear 12 to urge face 22 of the gear into abutment with the shoulder 18 of the pinion to eliminate any axial slack or movement between the gear members.

There is shown in FIG. 4 an alternate embodiment of the retaining means for the drive assembly of the present invention. In this embodiment, a retaining ring 29 is an arcuate spring having a generally trapezoidal cross section. The ring is disposed in the annular groove 19 of the pinion and has an angled face 30 which is substantially parallel to the cam surface 28 of the gear. As with the above described embodiment, the ring reacts against the cam surface to urge the gear into abutment with the shoulder 18 of the pinion. This particular configuration could be particularly adaptable to a rotatable connection, wherein splines are eliminated and both gears overlap the ring member.

The procedure for assembling the embodiments shown in FIGS. 1 and 4 is identical, with the first step being to install the retaining ring 13 (FIG. 1) or 29 (FIG. 4) in the annular groove 19 of the pinion 11. The teeth 14' of the reduced diameter portion 17 of the pinion 11 are aligned with the space between the internal teeth 25 of the gear 12, and inserted therein until the chamfer 26 contacts the retaining ring. With the ring centered relative to the chamfer, the gear is forced onto the pinion, whereby the chamfer compresses the retaining ring into the groove to the dotted line position shown on FIG. 2, to permit the internal teeth of the gear to pass over the retaining ring. When the side surface 22 of the gear abuts the radial shoulder 18 of the pinion 11, the cam surface 28 has passed the groove, allowing the retaining ring to expand and engage that cam surface. The outward bias of the retaining ring against the cam surface 28 forces the face 22 of gear 12 into tight abutment with the radial shoulder 18. During rotation of the cluster gear after it is installed in the gear train, centrifugal force acting on the retaining ring causes an additional force against the cam surface. The recess 27 is sized to prevent the ring from being accidentally expelled from the groove after the gears are assembled.

Should one of the gears become damaged, the composite drive assembly can be disassembled and the undamaged gear reused. To disassemble the gears, a tool having a plurality of fingers is inserted in the recess and compresses the ring into the groove to permit the gear to be removed.

From the above description, it is apparent that apart from the novel structure disclosed, there is also disclosed a novel method for making a cluster gear from a pair of individual gear members. This method is made possible by the herein disclosed keeper arrangement. The keeper arrangement comprises an annular groove defining a pair of opposing shoulders formed in one of said members, an opposing radially outwardly axially sloping shoulder formed on the other member, and a radially expandable retaining ring having an axial thickness in excess of the distance between the opposing shoulder of the separate members in the assembled position. The retaining ring is operative in conjunction with the opposing shoulders to retain the members in the assembled position and to eliminate axial clearance between the members.

The method in accordance with the present invention comprises a number of steps including the step of making a first gear having a first diameter of teeth, and forming a splined extension of said gear co-axial with and closely adjacent to the gear teeth. The splines may be formed by the step of extending the gear teeth thereof at a reduced diameter. A second gear is formed with a second diameter of teeth and with internal splines to cooperate with the splines of the first gear. The steps of providing the retaining shoulders and grooves may be carried out at any time prior to, or after formation of, the teeth and splines.

Prior to assembling the gears, a step of separately heat treating each of said gears to a pre-determined hardness is carried out. This method, including the steps of separate heat treatment, is important where separate hardnesses are desired for the respective gears.

While the present invention has been described with respect to specific embodiments and methods, it is clear that numerous changes and modifications may be made in the construction and arrangement of the illustrated embodiments without departing from the spirit and scope of the present invention as defined in the appended claims.

I claim:

1. A composite gear assembly comprising:
a plurality of gears detachably secured together;
one of said gears having a splined extension co-axial with the teeth thereof;
another of said gears having cooperating splines formed therein;
each of said gears including an annular shoulder opposing a like shoulder on the other of said members; one of said shoulders sloping outward toward the other of said shoulders; and,
an expandable retaining ring engaging said shoulder to retain said members in an axial pre-determined position.

2. The composite gear assembly of claim 1 wherein said gears have different diameters.

3. The composite gear assembly of claim 1 comprising another annular shoulder on each of said gears in abutting engagement.

4. The invention of claim 1 wherein said splines are an extension of the teeth of said one of said gears at a smaller diameter.

5. The invention of claim 1 wherein the shoulder on one of said gears defines a wall of an annular groove; and,
said retaining ring is retained in said groove by said sloping shoulder.

6. A coupling assembly for a pair of drive members;
a first member having a bore formed therein;
a second member receivable in said bore and including a shoulder abutting a shoulder on said first member;
a groove formed in one of said members;
the other of said members having an annular axially sloping face extending partially across said groove; and,
an annular spring member disposed in said groove and biased into engagement with said sloping face to maintain said first and said second members in a substantially fixed axial position with respect to one another.

7. The invention of claim 6 wherein said members are non-rotatably fixed with respect to one another.

8. The invention of claim 7 comprising cooperating splines formed on said members to fix said members with respect to one another.

9. The invention of claim 7 wherein said members are gears.

10. The invention of claim 8 wherein said splines are an extension at a reduced diameter of the teeth of one of said members.

11. A method of making a composite gear comprising the steps of:
  making a plurality of individual gears adapted to be detachably secured together;
  providing one of said gears with a splined extension co-axial with the teeth thereof;
  providing another of said gears with cooperating splines formed therein;
  providing each of said gears with an annular shoulder opposing a like shoulder on the other of said members; one of said shoulders sloping outward toward the other of said shoulders; assembling said gears with said splines in cooperative engagement; and,
  providing an expandable retaining ring engaging said shoulder to retain said members in an axial predetermined position.

12. The method of making composite gear of claim 11 comprising the steps of separately heat treating each of said gears to have a different pre-determined hardness prior to the step of assembling said gear.

13. The method of claim 11 wherein the step of providing said splined extension of one of said gears comprises the step of extending the teeth of said one of said gears at a reduced diameter.

* * * * *